US012695479B2

(12) United States Patent

Shimmyo et al.

(10) Patent No.: US 12,695,479 B2

(45) Date of Patent: Jul. 28, 2026

(54) REPEATER, CABLE, AND CONTROL METHOD

(71) Applicant: Nuvoton Technology Corporation Japan, Kyoto (JP)

(72) Inventors: Akinori Shimmyo, Hyogo (JP); Yoshihisa Tanaka, Kyoto (JP); Atsushi Ogaki, Osaka (JP)

(73) Assignee: Nuvoton Technology Corporation Japan, Kyoto (JP)

( * ) Notice: Subject to any disclaimer, the term of this patent is extended or adjusted under 35 U.S.C. 154(b) by 50 days.

(21) Appl. No.: 18/882,327

(22) Filed: Sep. 11, 2024

(65) Prior Publication Data

US 2025/0007557 A1     Jan. 2, 2025

Related U.S. Application Data

(63) Continuation of application No. PCT/JP2023/010796, filed on Mar. 20, 2023.

(30) Foreign Application Priority Data

Mar. 22, 2022     (JP) ................................. 2022-045652

(51) Int. Cl.
    *H04B 3/58*        (2006.01)
    *H04B 3/36*        (2006.01)

(52) U.S. Cl.
    CPC ................. *H04B 3/58* (2013.01); *H04B 3/36* (2013.01)

(58) Field of Classification Search
    CPC ... G06F 13/4045; G06F 13/4282; H04B 3/58; H04B 3/36
    See application file for complete search history.

(56) References Cited

U.S. PATENT DOCUMENTS

| | | | |
|---|---|---|---|
| 2005/0182876 A1 | 8/2005 | Kim et al. | |
| 2007/0076645 A1* | 4/2007 | VanDrunen ............. | H04L 12/66 370/315 |
| 2008/0162797 A1 | 7/2008 | Teicher et al. | |
| 2012/0167149 A1 | 6/2012 | Toba et al. | |
| 2018/0332371 A1 | 11/2018 | Suzuki et al. | |
| 2019/0068397 A1* | 2/2019 | Chen ....................... | H04L 12/40 |

(Continued)

FOREIGN PATENT DOCUMENTS

| | | |
|---|---|---|
| CN | 113094318 A | 7/2021 |
| JP | 04-326445 A | 11/1992 |

(Continued)

OTHER PUBLICATIONS

International Search Report dated May 30, 2023 issued in International Patent Application No. PCT/JP2023/010796, with English translation.

(Continued)

*Primary Examiner* — Dac V Ha

(74) *Attorney, Agent, or Firm* — Rimon P.C.

(57) ABSTRACT

A repeater connected to a communication channel that communicably connects two apparatuses, the repeater includes: a corrector that corrects a signal that travels through the communication channel; memory that is non-volatile writable memory and stores a parameter pertaining to an operation of the repeater; and a controller that uses the parameter stored in the memory to control an operation of the repeater.

14 Claims, 3 Drawing Sheets

(56) References Cited

U.S. PATENT DOCUMENTS

| | | | |
|---|---|---|---|
| 2019/0073329 A1 | 3/2019 | Tao et al. | |
| 2020/0257601 A1* | 8/2020 | Srivastava | G06F 11/2294 |
| 2020/0280757 A1 | 9/2020 | Morita et al. | |
| 2021/0209054 A1 | 7/2021 | Wu et al. | |
| 2022/0138135 A1* | 5/2022 | Lin | G06F 13/4295 |
| | | | 710/305 |
| 2022/0245079 A1 | 8/2022 | Yu et al. | |
| 2023/0081229 A1* | 3/2023 | Bajpai | G06F 13/382 |
| | | | 713/320 |
| 2024/0354270 A1* | 10/2024 | Vining | G06F 13/4282 |

FOREIGN PATENT DOCUMENTS

| | | |
|---|---|---|
| JP | 2000-020454 A | 1/2000 |
| JP | 2007-535235 A | 11/2007 |
| JP | 2010-515190 A | 5/2010 |
| JP | 2012-142692 A | 7/2012 |
| JP | 2018-191245 A | 11/2018 |
| WO | 2005/081659 A1 | 9/2005 |
| WO | 2008/081445 A2 | 7/2008 |
| WO | 2019/059151 A1 | 3/2019 |

OTHER PUBLICATIONS

Extended European Search Report dated Apr. 15, 2025 issued in the corresponding European Patent Application No. 23774846.2.
The 12C-Bus Specification, Version 2.1, Jan. 2000, pp. 1-46.
Samie B. Samaan et al., "High-speed Serial Bus Repeater Primer", Revision 1.2, Oct. 2015, pp. 1-72.
Official Communication Pursuant to Article 94(3) EPC dated Feb. 12, 2026 issued in the corresponding European Patent Application No. 23774846.2.
PCI Express, Wikipedia, revised on Jun. 17, 2020, pp. 1-23.

* cited by examiner

FIG. 7

REPEATER, CABLE, AND CONTROL METHOD

CROSS REFERENCE TO RELATED APPLICATIONS

This is a continuation application of PCT International Application No. PCT/JP2023/010796 filed on Mar. 20, 2023, designating the United States of America, which is based on and claims priority of Japanese Patent Application No. 2022-045652 filed on Mar. 22, 2022. The entire disclosures of the above-identified applications, including the specifications, drawings and claims are incorporated herein by reference in their entirety.

FIELD

The present disclosure relates to a repeater, a cable, and a control method.

BACKGROUND

In the universal serial bus (USB) power delivery (PD) standard, a USB apparatus capability or a USB communication mode can be between apparatuses. Since PD negotiated connected communication needs to be performed through a configuration channel (CC) line different from a USB data communication line, a USB active cable including a repeater has required a controller for USB PD communication besides the repeater.

In addition, operations of the USB data communication line and operations of the CC line require a large number of parameters. As a technique for ensuring degrees of freedom of parameters of the USB data communication line, there is a patent disclosed by Patent Literature (PTL) 1.

CITATION LIST

Patent Literature

PTL 1: U.S. Patent Application Publication No. 2021/0209054, the SPECIFICATION

SUMMARY

Technical Problem

Conventional active cables have required, for each of the USB data communication line and the CC line, inclusion of a controller and memory for parameters, and this results in an increase in the number of components to be equipped. In addition, although the controller disclosed by PTL 1 or a repeater included in the foregoing controller can integrate a controller of the communication line and a controller of the CC line, this integration reduces the flexibility of, for example, parameters that pertain to operation modes or signal corrections.

The present disclosure addresses such problems, and aims to provide a repeater, etc., that can integrate a controller of a data communication line and a controller of a CC line, and can flexibly change operations.

Solution to Problem

In order to address the above-described problems, a repeater according to one aspect of the present disclosure is a repeater connected to a communication channel that communicably connects two apparatuses. The repeater includes: a corrector that corrects a signal that travels through the communication channel; memory that is non-volatile writable memory and stores a parameter pertaining to an operation of the corrector; and a controller that uses the parameter stored in the memory to control an operation of the repeater.

Advantageous Effects

According to the present disclosure, a repeater can integrate a controller of a data communication line and a controller of a CC line, and can flexibly change operations.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 is a block diagram illustrating a configuration of repeaters according to the variation of the embodiment.

DESCRIPTION OF EMBODIMENTS

Figure 1:
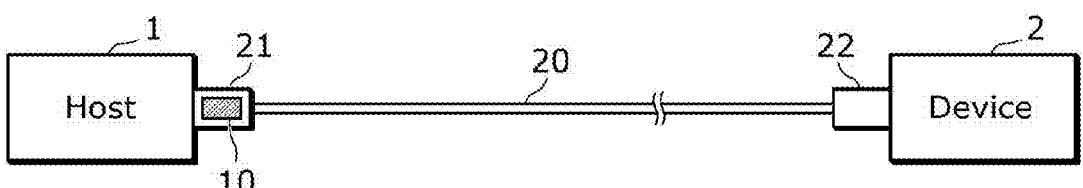
FIG. 1 is a diagram illustrating a configuration of a communication system according to an embodiment.

A repeater according to one aspect of the present disclosure is a repeater connected to a communication channel that communicably connects two apparatuses. The repeater includes: a corrector that corrects a signal that travels through the communication channel; memory that is non-volatile writable memory and stores a parameter pertaining to an operation of the corrector; and a controller that uses the parameter stored in the memory to control an operation of the repeater.

According to the above-described aspect, the repeater includes writable memory. Accordingly, a parameter stored in the memory can be changed. When a parameter is changed, an operation is determined in accordance with the changed parameter. If the repeater operates inflexibly using a preset parameter or operates using a parameter selected from among a plurality of preset parameters, the repeater cannot carry out a new operation other than operations based on the preset parameters, and thus lacks flexibility. However, the repeater according to one aspect of the present disclosure allows a parameter pertaining to a new operation (e.g., an operation corresponding to a new communication standard or to a new communication speed) to be written to the memory, and thus can flexibly determine an operation. As described above, the repeater according to one aspect of the present disclosure can more flexibly determine an operation.

In addition, the controller may: receive a control message from at least one apparatus out of the two apparatuses; store, in the memory, a parameter included in the control message received; and use the parameter stored in the memory to control the operation of the repeater.

According to the above-described aspect, the repeater determines an operation based on a new parameter received from at least one of two apparatuses connected to the communication channel. In other words, the repeater can change a processing detail under the control of an apparatus connected to the communication channel. As described, the repeater can readily and more flexibly determine an operation under the control of an apparatus connected to the communication channel.

Moreover, the communication channel may include a first line for data communication between the two apparatuses and a second line for communication for configuration of the two apparatuses which is different from the first line. The corrector may correct a signal that travels through the first line, and the controller may receive the control message via the second line.

According to the above-described aspect, the repeater determines an operation based on a new parameter included in a signal transmitted from an apparatus connected to the communication line to the second line, and performs a process on a data communication signal that travels through the first line. With this, the repeater can more flexibly determine an operation.

In addition, the controller may receive the control message from the at least one apparatus out of the two apparatuses, and may cause a transition from one of (i) a prohibition mode and (ii) a permission mode to the other of the prohibition mode and the permission mode. The prohibition mode is a mode in which rewriting to the memory is prohibited, and the permission mode is a mode in which rewriting to the memory is permitted.

According to the above-described aspect, the repeater can readily control permission and prohibition of writing to the memory based on a signal transmitted from an apparatus connected to the communication channel. If the repeater is allowed to unconditionally write, to the memory, a new parameter received from the apparatus connected to the communication channel, an unauthorized parameter may be written to the memory and may cause the repeater to operate in an unauthorized manner. In view of the above, control of prohibiting writing to the memory is allowed so as to restrict unconditional writing of new parameters to the memory. Moreover, when writing to the memory is to be permitted, control of permitting writing to the memory is allowed so as to allow appropriate writing of new parameters to the memory. As described above, the repeater can more appropriately determine an operation by controlling writing operations to the memory.

Moreover, the controller may receive the control message from the at least one apparatus out of the two apparatuses, and may store, in the memory, an identifier included in the control message as a first identifier that is an identifier of the repeater.

According to the above-described aspect, the repeater can change an identifier of the repeater based on a signal transmitted from an apparatus connected to the communication channel, and an operation of the repeater can be controlled. Setting of an appropriate identifier by an apparatus connected to the communication channel therefore allows the repeater to more flexibly determine an operation.

In addition, the controller may: among one or more messages received by the at least one apparatus out of the two apparatuses, receive a message including the first identifier and a message including a second identifier that is an identifier to control the repeater as control messages each of which is the control message directed to the repeater; and among the one or more messages, prohibit receiving a message including neither the first identifier nor the second identifier.

According to the above-described aspect, the repeater receives, as control messages, a message including an identifier of the repeater and a message including an identifier to control the repeater. With this, the repeater can readily receive control messages. Appropriate receiving of a control message therefore allows the repeater to flexibly determine an operation.

Moreover, the control message may include a parameter to be stored in the memory and an address at which the parameter is to be written, and the controller may store the parameter at the address.

According to the above-described aspect, the repeater stores a parameter included in a control message at an address included in the control message. The repeater can therefore store a designated parameter at an address designated by the apparatus connected to the communication channel. As described, the repeater can more readily and flexibly determine an operation in accordance with designation made by the apparatus connected to the communication channel.

In addition, the memory may be one time programmable (OTP) memory.

According to the above-described aspect, the repeater can more readily and flexibly determine an operation using an OTP memory.

Moreover, the memory may include a plurality of storage areas, and for each of the plurality of storage areas, a parameter that includes one or more parameters each of which is the parameter can be stored only once. The controller may: when a new parameter including one or more parameters each of which is the parameter to be stored in the memory is stored in the memory, store the new parameter in a storage area in which no parameter has yet been stored and which is a storage area among the plurality of storage areas; and when a parameter is read from the memory, read, from a storage area in which a parameter has been stored most recently and which is a storage area among the plurality of storage areas, the parameter stored.

According to the above-described aspect, the repeater controls writing and reading for each of a plurality of storage areas included in the OTP memory to implement writing of a parameter multiple times. As described above, making use of writing of a parameter multiple times using the OTP memory allows the repeater to more flexibly determine an operation.

In addition, the corrector may include a retimer or a redriver, and the memory may store the parameter pertaining to an operation of the retimer or an operation of the redriver.

According to the above-described aspect, the repeater corrects a signal using a retimer or a redriver to more appropriately correct a signal that travels through the first line.

Moreover, among communication channels that conform to a USB standard, the communication channel may be a data line for data communication between the two apparatuses. The controller may receive the control message from either of the two apparatuses via a configuration channel (CC) line for communication for configuration of the two apparatuses. The CC line is a line among the communication channels that conform to the USB standard. The memory may store a parameter to be referred to by eMarker or a parameter to be referred to by the corrector.

According to the above-described aspect, the repeater receives a control message that travels through a USB-standard CC line to determine an operation using a parameter included in a control message. The repeater therefore can more flexibly determine an operation.

In addition, the corrector may have an operation mode that conforms to at least one communication standard out of USB 4.0, USB 3.2, Thunderbolt (registered trademark) 3, DisplayPort Alt Mode, or HDMI (registered trademark) Alt Mode, and the memory may store the parameter for correcting the signal that conforms to the at least one communication standard.

According to the above-described aspect, the repeater can carry out an operation that conforms to at least one communication standard out of USB 4.0, USB 3.2, Thunderbolt (registered trademark) 3, DisplayPort Alt Mode, and HDMI (registered trademark) Alt Mode.

A cable according to one aspect of the present disclosure is a cable that includes a plug portion that includes the above-described repeater.

According to the above-described aspect, the cable produces the same advantageous effects as the above-described repeater.

A cable according to one aspect of the present disclosure is a cable that includes: a first plug portion that includes a first repeater that is the above-described repeater; and a second plug portion that includes a second repeater that is the above-described repeater. The first repeater and the second repeater are connected to a single communication channel that is the communication channel. An identifier of the first repeater which is stored in the memory of the first repeater is different from an identifier of the second repeater which is stored in the memory of the second repeater.

According to the above-described aspect, the cable can more flexibly operate using two repeaters connected to a single communication channel that connects two apparatuses.

A control method of controlling a repeater connected to a communication channel that communicably connects two apparatus. The repeater includes: a corrector that corrects a signal that travels through the communication channel; and memory that is non-volatile writable memory and stores a parameter pertaining to an operation of the repeater. The control method includes: correcting, by the corrector, the signal that travels through the communication channel; and using the parameter stored in the memory, controlling the operation of the repeater.

The above-described aspect produces the same advantageous effects as the above-described repeater.

Hereinafter, embodiments according to the present disclosure will be described with reference to the drawings. Note that the embodiments described below each show a specific example of the present disclosure. The numerical values, shapes, materials, elements, the arrangement, connection, and the like of the elements in the following embodiments are mere examples, and therefore do not intend to limit the present disclosure.

Moreover, the drawings each are a schematic diagram, and do not necessarily provide strictly accurate illustration. Accordingly, the drawings do not necessarily coincide with one another in terms of scales and the like. Throughout the drawings, the same reference sign is given to substantially the same element, and redundant description is omitted or simplified.

Embodiment

The present embodiment describes a repeater and a cable both of which can integrate a controller of a data communication line and a controller of a CC line, and can flexibly change operations.

FIG. 1 is a diagram illustrating a configuration of a communication system according to the embodiment.

As illustrated in FIG. 1, the communication system includes host 1, device 2, and cable 20.

Host 1 is an apparatus that controls device 2. Host 1 includes a receptacle (not illustrated) to which cable 20 is connected, and is communicably connected with device 2 by plug portion 21 of cable 20 being connected to the receptacle. Host 1 transmits and receives information to and from device 2 using communication via cable 20. A communication standard used for the communication between host 1 and device 2 is, for example, USB, and the present embodiment is described using the foregoing example although the communication standard is non-limiting. For example, host 1 is a personal computer.

Device 2 is an apparatus under the control of host 1. Device 2 includes a receptacle (not illustrated) to which cable 20 is connected, and is communicably connected with host 1 by plug portion 22 of cable 20 being connected to the receptacle. Device 2 transmits and receives information to and from host 1 using communication via cable 20. For example, device 2 is an apparatus (the so-called peripheral) connected to a personal computer to be used, and is a display apparatus, a printer apparatus, or an input apparatus, such as a mouse and a keyboard.

Cable 20 is a cable that communicably connects host 1 and device 2. Stated differently, cable 20 creates a communication channel that communicably connects host 1 and device 2 (also simply called a "communication channel"). The communication channel includes a line for data communication (also called a data line or a first line) between host 1 and device 2 and a communication line for configuration (also called a configuration line or a second line) of host 1 and device 2.

When a communication standard used for the communication between host 1 and device 2 is USB, the first line corresponds to a line connected to a pin (i.e., TXp, TXn, RXp, RXn, Dp, or Dn) for transmitting and receiving a data communication signal. Moreover, the configuration line corresponds to a line (also called a CC line) connected to a pin (i.e., configuration channel (CC)) for transmitting and receiving a communication signal for configuration. Note that the communication for configuration may also be typically called power delivery (PD) communication.

Cable 20 has a function of (i) performing a waveform correction process on a signal transmitted by one of host 1 and device 2 and (ii) transmitting the signal to the other of host 1 and device 2. Cable 20 includes two plug portions 21 and 22. Here, plug portion 21 is connected to, for example, host 1 and plug portion 22 is connected to, for example, device 2.

Cable 20 includes repeater 10 that performs the above-described processes in at least one of the two plug portions 21 and 22. The present embodiment is described using an example in which cable 20 includes repeater 10 in plug portion 21, but the same description also applies to the case where repeater 10 is included in plug portion 22. Note that a configuration in which cable 20 includes repeaters in respective two plug portions 21 and 22 will be described later in a variation.

Figure 2:
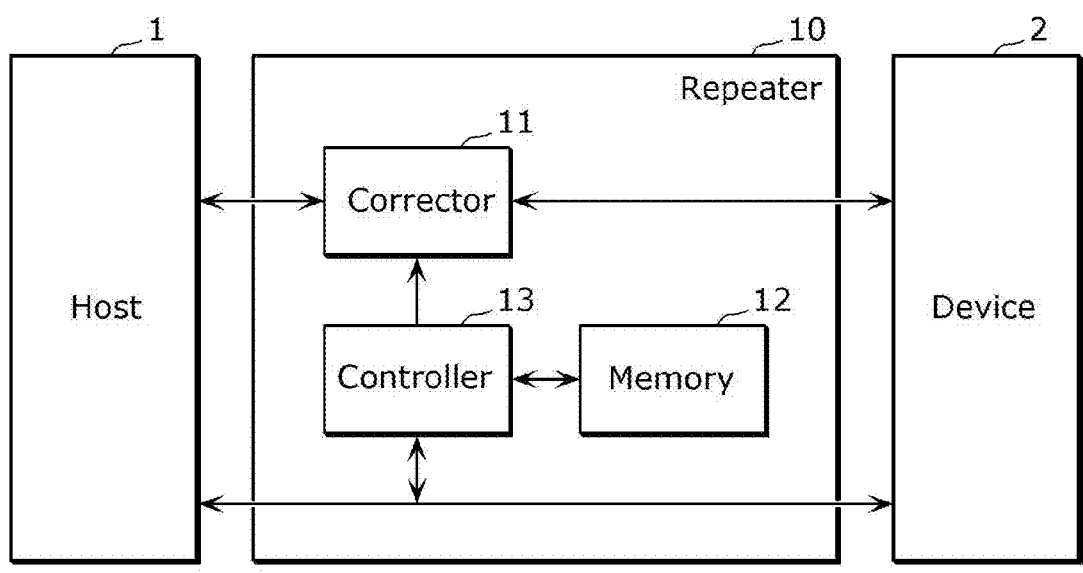
FIG. 2 is a block diagram illustrating a configuration of a repeater according to the embodiment.

FIG. 2 is a block diagram illustrating a configuration of repeater 10 according to the embodiment. Note that part of the illustration, such as cable 20, is omitted from FIG. 2.

As illustrated in FIG. 2, repeater 10 includes corrector 11, memory 12, and controller 13.

Corrector 11 is a functional unit that corrects a signal that travels through the communication channel. Corrector 11 is connected to the data line. Corrector 11 receives a signal transmitted by host 1 through the data line, performs a waveform correction process on the received signal, and outputs the corrected signal to device 2. The waveform correction process performed on a signal includes, for example, a process of compensating a signal that is degraded due to amplitude attenuation or jitter, a process of emphasizing edges of a signal waveform, etc. The amount or strength of the correction process is controlled by a parameter designated by controller 13.

To be more specific, corrector 11 includes a retimer or a redriver, and the above-described processes are performed by the retimer or the redriver.

A signal to be corrected by corrector 11 may be a signal that conforms to at least one communication standard out of USB 4.0, USB 3.2, Thunderbolt (registered trademark) 3, DisplayPort Alt Mode, and HDMI (registered trademark) Alt Mode.

Memory 12 is non-volatile writable memory. Memory 12 stores parameters pertaining to operations of corrector 11 and controller 13. Memory 12 stores, for example, a repeater identification (ID) of repeater 10 or a parameter for correcting a signal to be corrected by corrector 11. Memory 12 is, for example, one time programmable (OTP) memory. Memory 12 stores a parameter to be referred to by eMarker or a parameter to be referred to by corrector 11.

When corrector 11 includes a retimer or a redriver, memory 12 stores a parameter pertaining to an operation of the retimer or an operation of the redriver.

Controller 13 is a functional unit that controls communication of the configuration line and operations of corrector 11. Controller 13 uses parameters stored in memory 12 to control operations to be carried out by repeater 10. The control of operations to be carried out by repeater 10 includes control of communication of the configuration line or control of operations of corrector 11.

Controller 13 is connected to the configuration line (e.g., a CC line in the USB standard), and receives a control message via the configuration line. The control message may be a message transmitted by at least one of host 1 and device 2.

When controller 13 receives a control message, controller 13 receives, as a control message, a message including a repeater ID (corresponding to a first identifier) of repeater 10 among one or more messages transmitted by either host 1 or device 2 through the configuration line. In addition, controller 13 may further receive, as a control message, a message including an ID (corresponding to a second identifier) for controlling repeater 10 among the one or more messages. Moreover, controller 13 may abandon, or in other words, may prohibit receiving a message including neither the first identifier nor the second identifier among the one or more messages.

Specifically, when controller 13 receives a control message from at least one of host 1 and device 2, controller 13 stores, in memory 12, a parameter included in the received control message. Thereafter, controller 13 uses the parameter stored in memory 12 to control an operation of repeater 10.

The parameter may include, for example, a type of a communication standard that repeater 10 is compliant with, a cable parameter, a repeater ID, a parameter for correction (an amplification magnification, strength of an edge emphasizing process, etc.) to be made by corrector 11.

Specifically, the type of the communication standard may be USB 4.0, USB 3.2, Thunderbolt (registered trademark) 3, DisplayPort Alt Mode, HDMI (registered trademark) Alt Mode, etc. The cable parameter includes, the maximum communication speed or the maximum supply power for communication between host 1 and device 2 via cable 20. The repeater ID is an identifier that can uniquely identify repeater 10. The parameter for correction includes, specifically, an amplification magnification used in a process of compensating a signal, the strength of an edge emphasizing process, etc.

Repeater 10 operating using a new parameter allows repeater 10 to carry out an operation corresponding to a new communication standard or to a new communication speed. Note that a parameter may be a set of one or more parameters (also called a parameter set).

In addition, controller 13 can control prohibition or permission of rewriting to memory 12. Specifically, when controller 13 receives a control message, controller 13 causes a transition from one of (i) the prohibition mode in which rewriting to memory 12 is prohibited and (ii) the permission mode in which rewriting to memory 12 is permitted to the other of the prohibition mode and the permission mode. This case is based on the premise that controller 13 is configured to operate switching the operation modes between the prohibition mode in which rewriting to memory 12 is prohibited and the permission mode in which rewriting to memory 12 is permitted.

Moreover, when controller 13 receives a control message, controller 13 may store, in memory 12, an identifier included in the received message as a repeater ID (corresponding to a first identifier). After a new repeater ID is stored in memory 12, controller 13 starts receiving a control message including the new repeater ID.

Figure 3:
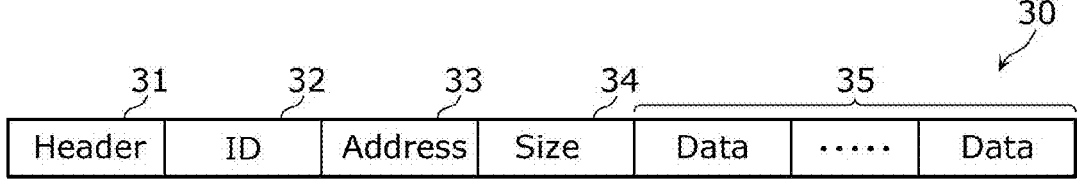
FIG. 3 is a diagram illustrating a structure of a control message according to the embodiment.

FIG. 3 is a diagram illustrating a structure of control message 30 according to the embodiment.

As illustrated in FIG. 3, control message 30 includes header 31, ID 32, address 33, size 34, data 35.

Header 31 is a field that includes information indicating, for example, a message type of the control message 30.

ID 32 is a field that includes an identifier indicating a destination of the control message 30.

Address 33 is a field that includes an address in memory 12 at which a parameter included in the control message 30 is to be stored.

Size 34 is a field that includes a data size of data 35 included in the control message 30.

Data 35 is a field that indicates data conveyed by the control message 30. Data 35 includes a parameter to be stored in memory 12. Note that data 35 may be one or more items of data 35.

Figure 4:
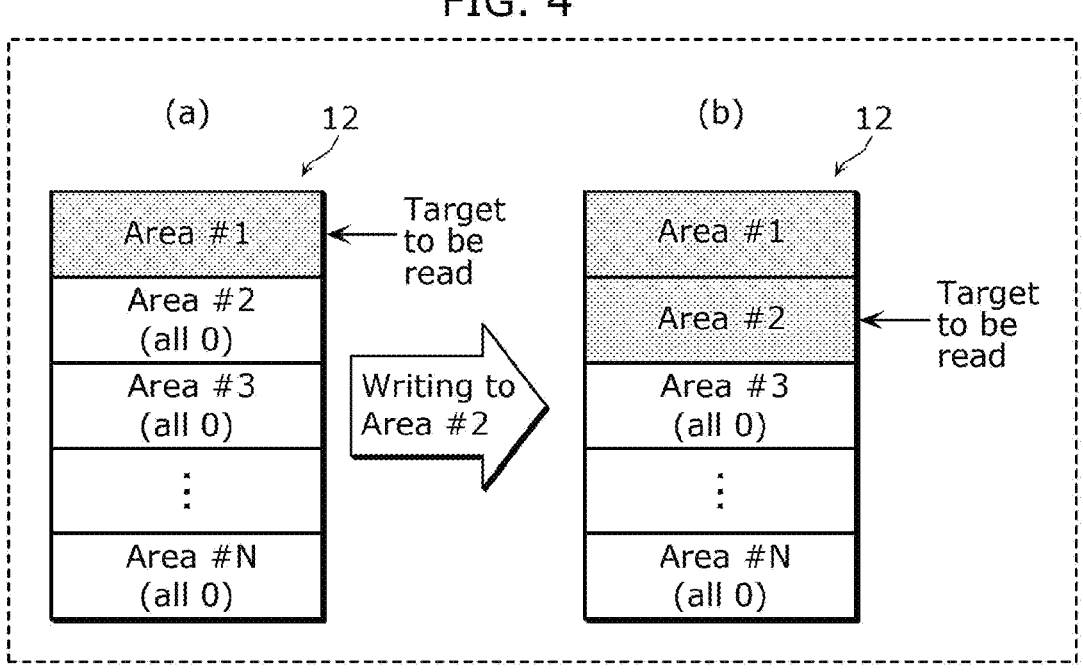
FIG. 4 is a diagram illustrating a method of writing and reading of a parameter according to the embodiment.

FIG. 4 is a diagram illustrating a method of writing and reading of a parameter according to the embodiment.

As illustrated in FIG. 4, memory 12 includes, as a plurality of storage areas, areas #1, #2, . . . , and #N. The letter N is an optional number of two or more, and is, for example, 10, but the number is non-limiting. Here, the plurality of storage areas are to be used for writing and reading in the order of numbers given to these areas.

Memory 12 is managed by controller 13 such that a parameter can be stored only once for each storage area.

When controller 13 receives a particular control message, controller 13 stores, in memory 12, a parameter included in the received control message.

When controller 13 stores a parameter to be newly stored (also called a new parameter) in memory 12, controller 13 stores the new parameter in a storage area in which no parameter has yet been stored among the plurality of storage areas. In addition, when controller 13 reads a parameter from memory 12, controller 13 reads, from a storage area in which a parameter has been stored the most recently among the plurality of storage areas, the stored parameter.

For example, part (a) of FIG. 4 shows a state in which a parameter is stored in area #1 and no parameter has yet been stored (e.g., a state of all zeros, where all bits indicate zero) in area #2 through area #N.

When controller 13 reads a parameter from memory 12 in the state shown in part (a) of FIG. 4, controller 13 makes a search for a storage area in which a parameter is stored in the ascending order (area #1, area #2 . . . ) of the numbers given to storage areas, and finds area #1. Thereafter, controller 13 selects area #1 that is the last storage area found among storage areas in which parameters are stored as a target storage area from which a parameter is to be read.

In addition, when controller 13 stores a new parameter in memory 12 in the state shown in part (a) of FIG. 4, controller 13 makes a search for a storage area in which no parameter has yet been stored in the ascending order of the numbers given to the storage areas (area #1, area #2 . . . ), and finds area #2, area #3 . . . . Thereafter, controller 13 stores the new parameter in area #2 that is the first storage area found among the found storage areas. As a result of the above, memory 12 will be in a state shown in part (b) of FIG. 4.

When controller 13 reads a parameter from memory 12 in the state shown in part (b) of FIG. 4, controller 13 makes the same search as described above and finds area #1 and area #2 as storage areas in which parameters are stored. Thereafter, controller 13 selects area #2 that is the last storage area found among the storage areas in which parameters are stored as a target storage area from which a parameter is to be read.

As has been described above, repeater 10 can use memory 12 that can be written to only once as rewritable memory that can be rewritten to multiple times.

A control method of controlling repeater 10 that is configured as described above will be described.

Figure 5:
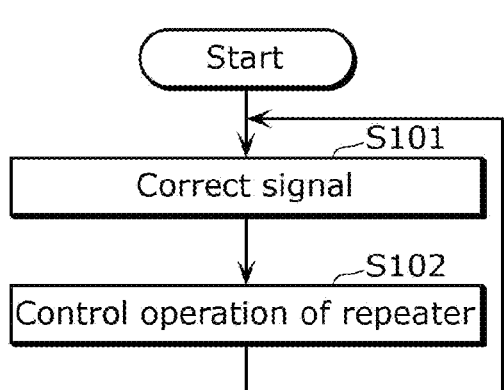
FIG. 5 is a flowchart illustrating a control method of controlling the repeater according to the embodiment.

FIG. 5 is a flowchart illustrating a control method of controlling repeater 10 according to the embodiment. Note that the control method of controlling repeater 10 shown in FIG. 5 may also be said as a control method of controlling cable 20.

In step S101, corrector 11 corrects a signal that travels through the communication channel.

In step S102, controller 13 uses a parameter stored in memory 12 to control an operation of repeater 10. From then on, the processes are performed, returning to step S101.

Note that the order in which step S101 and step S102 are performed may be reversed.

With a series of processes shown in FIG. 5, the repeater can more flexibly correct signals.

Variation of Embodiment

The present variation describes a repeater and a cable according to another aspect of the embodiment which can integrate a controller of a data communication line and a controller of a CC line, and can flexibly change operations. Particularly, a configuration in which cable 20 includes repeaters in respective two plug portions 21 and 22 will be described.

Figure 6:
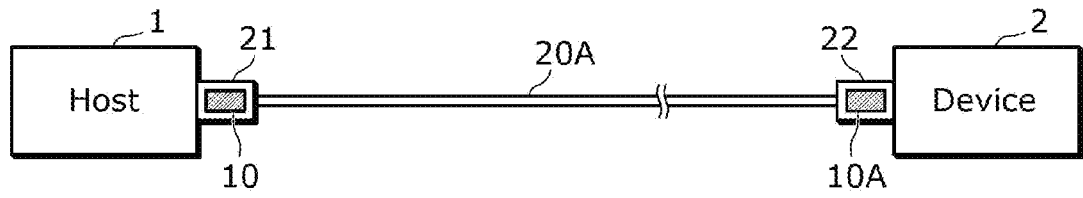
FIG. 6 is a diagram illustrating a configuration of a communication system according to a variation of the embodiment.

FIG. 6 is a diagram illustrating a configuration of a communication system according to the variation of the embodiment.

As illustrated in FIG. 6, a communication system includes host 1, device 2, and cable 20A. Host 1 and device 2 are the same as those of the above-described embodiment.

Repeaters 10 and 10A are connected to cable 20A (corresponding to a single communication channel) that communicably connects host 1 and device 2.

In the same manner as cable 20 according to the above-described embodiment, cable 20A has a function of (i) correcting the waveform of a signal received from one of host 1 and device 2 and (ii) transmitting the signal to the other of host 1 and device 2. Cable 20A includes two plug portions 21 and 22. Cable 20A includes repeater 10 in plug portion 21 and repeater 10A in plug portion 22. Repeater 10A has the same configuration as repeater 10.

Figure 7:
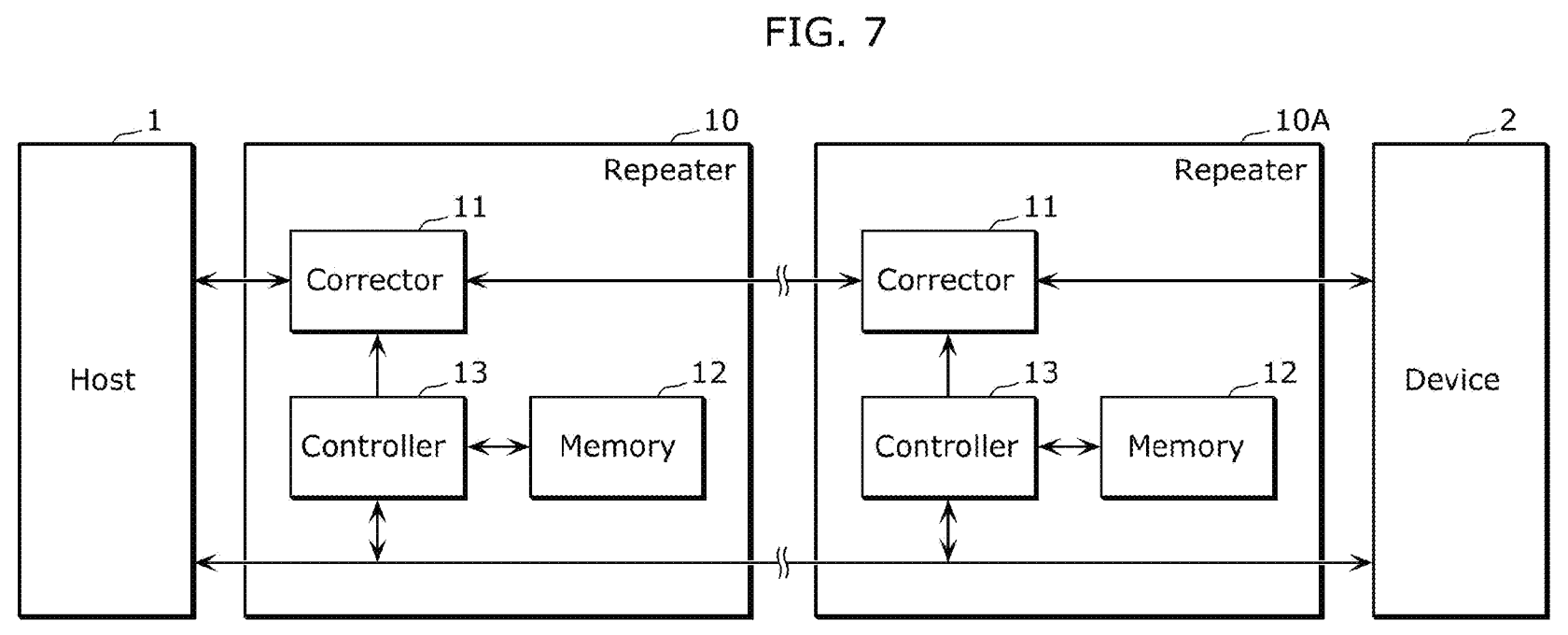

FIG. 7 is a block diagram illustrating a configuration of repeaters 10 and 10A according to the variation.

As illustrated in FIG. 7, both repeaters 10 and 10A have the same configuration as repeater 10 according to the above-described embodiment.

Correctors 11 included in respective repeaters 10 and 10A are connected to a data line connecting host 1 and device 2. Stated differently, the data line to which both repeaters 10 and 10A are connected is common to both repeaters 10 and 10A.

In addition, controllers 13 included in respective repeaters 10 and 10A are connected to a configuration line connecting host 1 and device 2. Stated differently, the configuration line to which both repeaters 10 and 10A are connected is common to both repeaters 10 and 10A.

The repeater ID stored in memory 12 of repeater 10 is different from the repeater ID stored in memory 12 of repeater 10A. As described, the difference in the above-mentioned repeater IDs allow host 1 to individually control an operation of repeater 10 and an operation of repeater 10A.

In other words, host 1 transmits a control message including the repeater ID of repeater 10 to cause controller 13 of repeater 10 to receive the control message. With this, host 1 can control an operation of repeater 10. Moreover, host 1 transmits a control message including the repeater ID of repeater 10A to cause controller 13 of repeater 10A to receive the control message. With this, host 1 can control an operation of repeater 10A.

As has been described above, the repeater according to the above-described embodiment or the above-described variation includes writable memory, and thus a parameter stored in the memory can be changed. When a parameter is changed, an operation is determined in accordance with the changed parameter. If a repeater operates inflexibly using a preset parameter or operates using a parameter selected from among a plurality of preset parameters, the repeater cannot carry out a new operation other than operations based on the preset parameters, and thus lacks flexibility. However, the repeater according to one aspect of the present disclosure allows a parameter pertaining to a new operation (e.g., an operation corresponding to a new communication standard or to a new communication speed) to be written to the memory, and thus can flexibly determine an operation. As described above, the repeater according to one aspect of the present disclosure can more flexibly determine an operation.

In addition, the cable according to the above-described embodiment or the above-described variation produces the same advantageous effects as the above-described repeater.

The embodiments have been described hereinbefore, but the present disclosure is not limited to these embodiments.

Those skilled in the art will readily appreciate that various modifications may be made in these embodiments and that other embodiments may be obtained by optionally combining the elements and functions of the embodiments without materially departing from the novel teachings and advantages of the present disclosure. Accordingly, all such modifications and other embodiments are included in the present disclosure.

INDUSTRIAL APPLICABILITY

The repeater according the present disclosure is applicable to a cable conforming to a communication standard, such as USB.

The invention claimed is:

1. A repeater connected to a communication channel that communicably connects two apparatuses, the repeater comprising:

a corrector that corrects a signal that travels through the communication channel;

memory that is non-volatile writable memory and stores a parameter pertaining to an operation of the corrector; and a controller that uses the parameter stored in the memory to control an operation of the repeater, wherein the controller:

receives a control message from at least one apparatus out of the two apparatuses;

stores, in the memory, a parameter included in the control message received; and uses the parameter stored in the memory to control the operation of the repeater.

2. The repeater according to claim 1, wherein the communication channel includes a first line for data communication between the two apparatuses and a second line for communication for configuration of the two apparatuses which is different from the first line, the corrector corrects a signal that travels through the first line, and the controller receives the control message via the second line.

3. The repeater according to claim 1, wherein the controller receives the control message from the at least one apparatus out of the two apparatuses, and causes a transition from one of (i) a prohibition mode and (ii) a permission mode to an other of the prohibition mode and the permission mode, the prohibition mode being a mode in which rewriting to the memory is prohibited, the permission mode being a mode in which rewriting to the memory is permitted.

4. The repeater according to claim 1, wherein the controller receives the control message from the at least one apparatus out of the two apparatuses, and stores, in the memory, an identifier included in the control message as a first identifier that is an identifier of the repeater.

5. The repeater according to claim 4, wherein the controller:

among one or more messages received by the at least one apparatus out of the two apparatuses, receives a message including the first identifier and a message including a second identifier that is an identifier to control the repeater as control messages each of which is the control message directed to the repeater; and among the one or more messages, prohibits receiving a message including neither the first identifier nor the second identifier.

6. The repeater according to claim 1, wherein the control message includes a parameter to be stored in the memory and an address at which the parameter is to be written, and the controller stores the parameter at the address.

7. The repeater according to claim 1, wherein the memory is one time programmable (OTP) memory.

8. The repeater according to claim 7, wherein the memory includes a plurality of storage areas, and for each of the plurality of storage areas, a parameter comprising one or more parameters each of which is the parameter can be stored only once, and the controller:

when a new parameter comprising one or more parameters each of which is the parameter to be stored in the memory is stored in the memory, stores the new parameter in a storage area in which no parameter has yet been stored, the storage area being among the plurality of storage areas; and when a parameter is read from the memory, reads, from a storage area in which a parameter has been stored most recently, the parameter stored, the storage area being among the plurality of storage areas.

9. The repeater according to claim 1, wherein the corrector includes a retimer or a redriver, and the memory stores the parameter pertaining to an operation of the retimer or an operation of the redriver.

10. The repeater according to claim 1, wherein among communication channels that conform to a USB standard, the communication channel is a data line for data communication between the two apparatuses, the controller receives the control message from either of the two apparatuses via a configuration channel (CC) line for communication for configuration of the two apparatuses, the CC line being among the communication channels that conform to the USB standard, and the memory stores a parameter to be referred to by eMarker or a parameter to be referred to by the corrector.

11. A cable comprising:

a plug portion that includes the repeater according to claim 1.

12. A repeater connected to a communication channel that communicably connects two apparatuses, the repeater comprising:

a corrector that corrects a signal that travels through the communication channel;

memory that is non-volatile writable memory and stores a parameter pertaining to an operation of the corrector; and a controller that uses the parameter stored in the memory to control an operation of the repeater, wherein:

the corrector has an operation mode that conforms to at least one communication standard out of USB 4.0, USB 3.2, Thunderbolt (registered trademark) 3, DisplayPort Alt Mode, or HDMI (registered trademark) Alt Mode, and the memory stores the parameter for correcting the signal that conforms to the at least one communication standard.

13. A cable comprising:

a first plug portion that includes a first repeater; and a second plug portion that includes a second repeater, wherein the first repeater:

is connected to a first communication channel that communicably connects two apparatuses; and includes:

a first corrector that corrects a signal that travels through the first communication channel;

first memory that is non-volatile writable memory and stores a first parameter pertaining to an operation of the first corrector; and a first controller that uses the first parameter stored in the first memory to control an operation of the first repeater, the second repeater:

is connected to a second communication channel that communicably connects the two apparatuses; and includes:

a second corrector that corrects a signal that travels through the second communication channel;

second memory that is non-volatile writable memory and stores a second parameter pertaining to an operation of the second corrector; and a second controller that uses the second parameter stored in the second memory to control an operation of the second repeater, the first repeater and the second repeater are connected to a single communication channel composed of the first communication channel and the second communication channel, and an identifier of the first repeater which is stored in the first memory of the first repeater is different from an identifier of the second repeater which is stored in the second memory of the second repeater.

14. A control method of controlling a repeater connected to a communication channel that communicably connects two apparatuses, wherein the repeater includes:

a corrector that corrects a signal that travels through the communication channel; and memory that is non-volatile writable memory and stores a parameter pertaining to an operation of the repeater, and the control method comprises:

correcting, by the corrector, the signal that travels through the communication channel;

receiving a control message from at least one apparatus out of the two apparatuses;

storing, in the memory, the parameter which is included in the control message received;

using the parameter stored in the memory to control the operation of the repeater.

* * * * *